(12) United States Patent
Green

(10) Patent No.: US 12,708,169 B2
(45) Date of Patent: Aug. 18, 2026

(54) MULTILAYERED HELMET WITH INDEPENDENTLY MOVABLE SEGMENTS

(71) Applicant: ENG Designs, LLC, Brownsburg, IN (US)

(72) Inventor: Eric Green, Brownsburg, IN (US)

(73) Assignee: ENG Designs, LLC, Brownsburg, IN (US)

( * ) Notice: Subject to any disclaimer, the term of this patent is extended or adjusted under 35 U.S.C. 154(b) by 806 days.

(21) Appl. No.: 16/887,777

(22) Filed: May 29, 2020

(65) Prior Publication Data

US 2020/0375300 A1 Dec. 3, 2020

Related U.S. Application Data

(60) Provisional application No. 62/937,549, filed on Nov. 19, 2019, provisional application No. 62/854,018, filed on May 29, 2019.

(51) Int. Cl.

| | |
|---|---|
| ***A42B 3/32*** | (2006.01) |
| ***A42B 3/06*** | (2006.01) |
| ***A42B 3/12*** | (2006.01) |
| ***A42B 3/20*** | (2006.01) |
| ***B32B 1/00*** | (2024.01) |
| ***B32B 3/14*** | (2006.01) |
| ***B32B 3/20*** | (2006.01) |
| ***B32B 7/06*** | (2019.01) |
| ***B32B 7/08*** | (2019.01) |
| ***B32B 7/12*** | (2006.01) |
| ***B32B 9/00*** | (2006.01) |

(52) U.S. Cl.

CPC .............. *A42B 3/328* (2013.01); *A42B 3/064* (2013.01); *A42B 3/121* (2013.01); *A42B 3/20* (2013.01); *B32B 1/00* (2013.01); *B32B 3/14* (2013.01); *B32B 3/20* (2013.01); *B32B 7/06* (2013.01); *B32B 7/08* (2013.01); *B32B 7/12* (2013.01); *B32B 9/00* (2013.01); *B32B 2437/04* (2013.01); *B32B 2571/00* (2013.01)

(58) Field of Classification Search

CPC ...................................................... A42B 3/328

See application file for complete search history.

(56) References Cited

U.S. PATENT DOCUMENTS

| | | | | |
|---|---|---|---|---|
| 2009/0044315 A1* | 2/2009 | Belanger | A42B 3/324 | 2/420 |
| 2013/0232668 A1* | 9/2013 | Suddaby | A42B 3/064 | 2/413 |
| 2015/0164172 A1* | 6/2015 | Linares | A42B 3/20 | 2/411 |

(Continued)

*Primary Examiner* — Maria V Ewald
*Assistant Examiner* — Daniel P Dillon
(74) *Attorney, Agent, or Firm* — Faegre Drinker Biddle & Reath LLP

(57) ABSTRACT

The present disclosure provides a helmet that includes a segmented outer shell comprising a plurality of independently movable segments. The helmet also includes internal layers that comprise flexible bearings and other optional padding to provide mobility to the segmented outer shell and to provide impact protection via force dispersion and compression of the layers of the helmet. In a first embodiment, the bearing is a substantially hemispherically-shaped node. In a second embodiment, the bearing is a substantially torus-shaped pad.

27 Claims, 16 Drawing Sheets

(56) References Cited

U.S. PATENT DOCUMENTS

| | | | | |
|---|---|---|---|---|
| 2016/0029733 | A1 * | 2/2016 | Kovarik | A42B 3/20 2/424 |
| 2018/0027909 | A1 * | 2/2018 | Bangera | A41D 13/018 |
| 2018/0035742 | A1 * | 2/2018 | Salvetti | A42B 3/328 |

* cited by examiner

MULTILAYERED HELMET WITH INDEPENDENTLY MOVABLE SEGMENTS

CROSS REFERENCE TO RELATED APPLICATION

This application claims priority to U.S. Provisional Patent Application Nos. 62/937,549, filed Nov. 19, 2019, and 62/854,018, filed May 29, 2019, the disclosures of which are hereby expressly incorporated by reference herein in their entirety.

FIELD OF THE DISCLOSURE

The present disclosure relates generally to protective head gear and, more particularly, to helmets.

BACKGROUND OF THE DISCLOSURE

Helmets and protective head gear are worn to protect against head injuries in various applications including contact sports, off-road vehicle operation, and motorcycle operation, for example. The impact protection capability of the helmet is an area where constant improvement is needed to ensure safety is provided to the user. In addition, the configuration of a helmet is an area where improvement is needed as it can often be difficult to remove the helmet without straining the user's head and neck, e.g., in the event of an injury when the helmet needs to be removed.

SUMMARY OF THE DISCLOSURE

The present disclosure provides a helmet that includes a segmented outer shell comprising a plurality of independently movable segments. The helmet also includes internal layers that comprise impact-absorbing or flexible bearings and other optional padding to provide mobility to each segment of the segmented outer shell and to provide impact protection via force dispersion and compression of the layers of the helmet. In a first embodiment, the bearing is a substantially hemispherically-shaped gel node. In a second embodiment, the bearing is a substantially torus-shaped gel pad.

According to an exemplary embodiment of the present disclosure, a helmet is provided including an inner shell, an outer shell coupled to the inner shell, the outer shell spaced apart from the inner shell to define a space therebetween, an impact-absorbing bearing positioned between the outer shell and the inner shell, and wherein the outer shell is movable about the bearing relative to the inner shell.

According to another exemplary embodiment of the present disclosure, a helmet is provided including an inner shell, an outer shell coupled to the inner shell, the outer shell spaced apart from the inner shell to define a space therebetween, the outer shell includes a plurality of independently movable segments, each independently moveable segment moveably coupled to the inner shell such that the plurality of independently movable segments are movable upon impact to disperse impact forces applied onto the movable segments, and at least one impact-absorbing internal layer within the space.

According to yet another exemplary embodiment of the present disclosure, a method of assembling a helmet is disclosed including providing a plurality of base plates within corresponding base plate holes of an inner shell, seating a plurality of bearings onto the inner shell, placing a plurality of segments of an outer shell onto corresponding bearings, and moveably coupling each segment of the outer shell to the corresponding base plate of the inner shell via the corresponding bearing.

According to still yet another exemplary embodiment of the present disclosure, a helmet is provided including an inner shell, an outer shell including a first segment and a second segment, a first bearing positioned between the inner shell and the first segment, a second bearing positioned between the inner shell and the second segment, a first anchor that moveably couples the first segment to the inner shell with movement across the first bearing, and a second anchor that moveably couples the second segment to the inner shell with movement across the second bearing independent of the movement of the first segment across the first bearing.

Additional features and advantages of the present disclosure will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
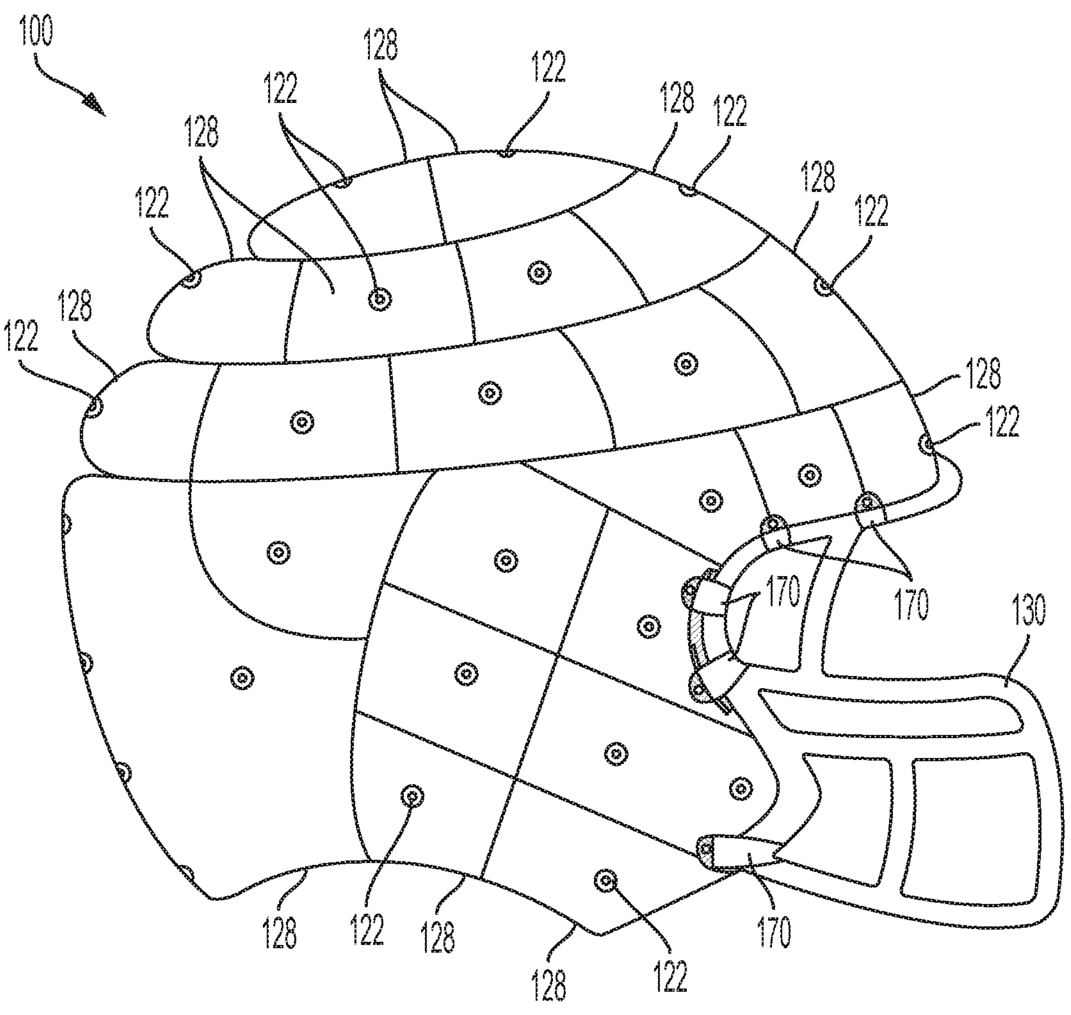
FIG. 1 is a side view of a helmet with a segmented outer shell including a plurality of movable outer shell segments, an inner shell, a plurality of internal layers between the inner shell and the outer shell, and a facemask in accordance with the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

The present disclosure provides a helmet that includes a segmented outer shell comprising a plurality of independently movable segments. The helmet also includes internal layers that comprise flexible bearings and other optional padding to provide mobility to each segment of the segmented outer shell and to provide impact protection via force dispersion and compression of the layers of the helmet. In a first embodiment, the bearing is a substantially hemispherically-shaped node. In a second embodiment, the bearing is a substantially torus-shaped pad.

First Helmet Embodiment

Figure 2:
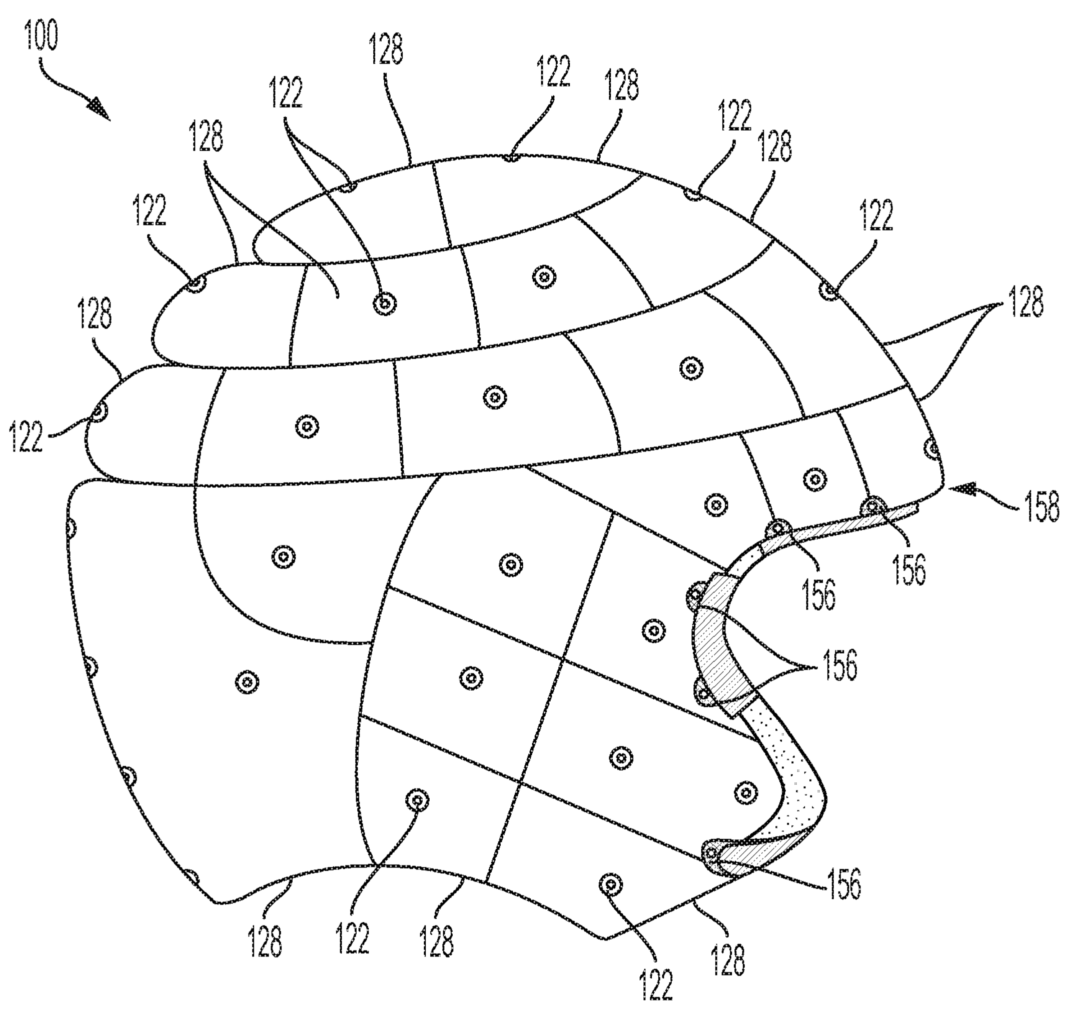
FIG. 2 is a side view of the helmet of FIG. 1 with the facemask removed.

Referring first to FIGS. 1 and 2, helmet 100 is shown with a plurality of individual segments 128 that cooperate to form an outer shell 108 and a facemask 130 coupled to helmet 100 via fasteners 170. As discussed further herein, segments 128 are each independently movable relative to a user to provide impact protection to a user's skull when in use. The illustrative helmet 100 includes eight segments 128 located along a centerline of the helmet 100, fourteen segments 128 located on a right side of the helmet 100, and fourteen segments 128 located on a left side of the helmet 100 (not shown), but the number and location of segments 128 may vary. Together, the segments 128 make up the entire outer shell 108, spanning entirely from a front side to a rear side of the helmet 100 and from the right side to the left side of the helmet 100.

Figure 7:
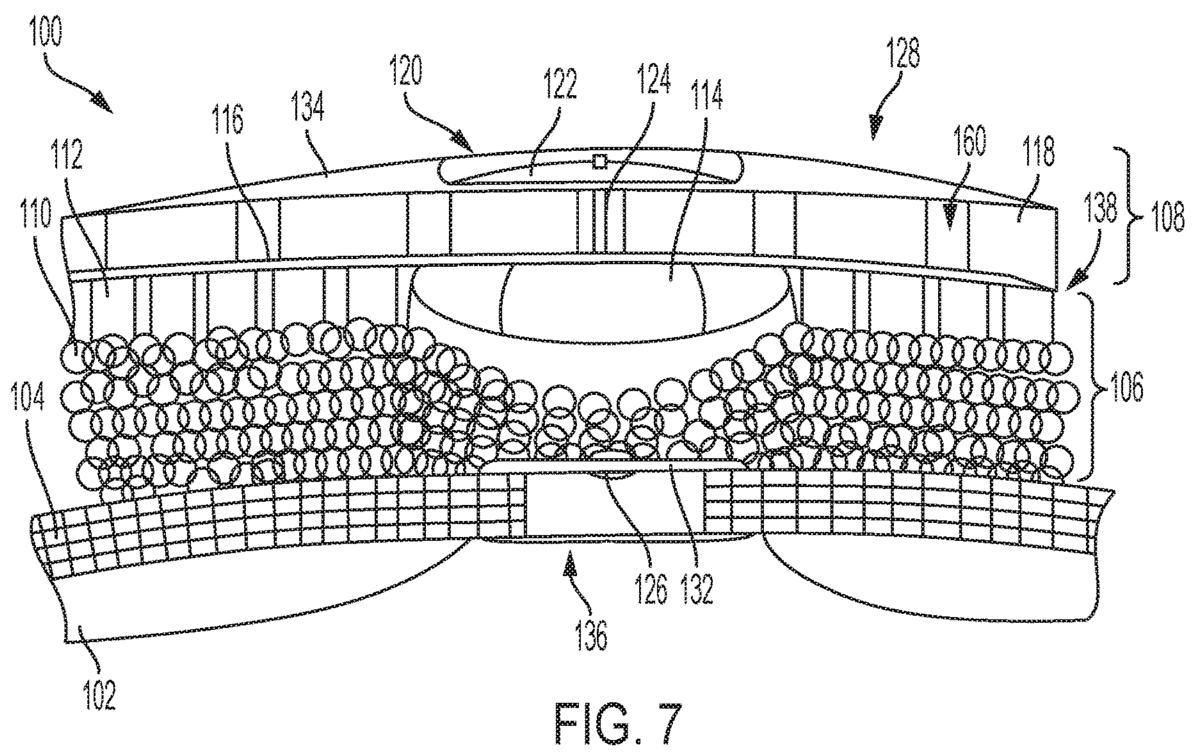
FIG. 7 is a cross sectional view of the helmet of FIG. 1.
Figure 8:
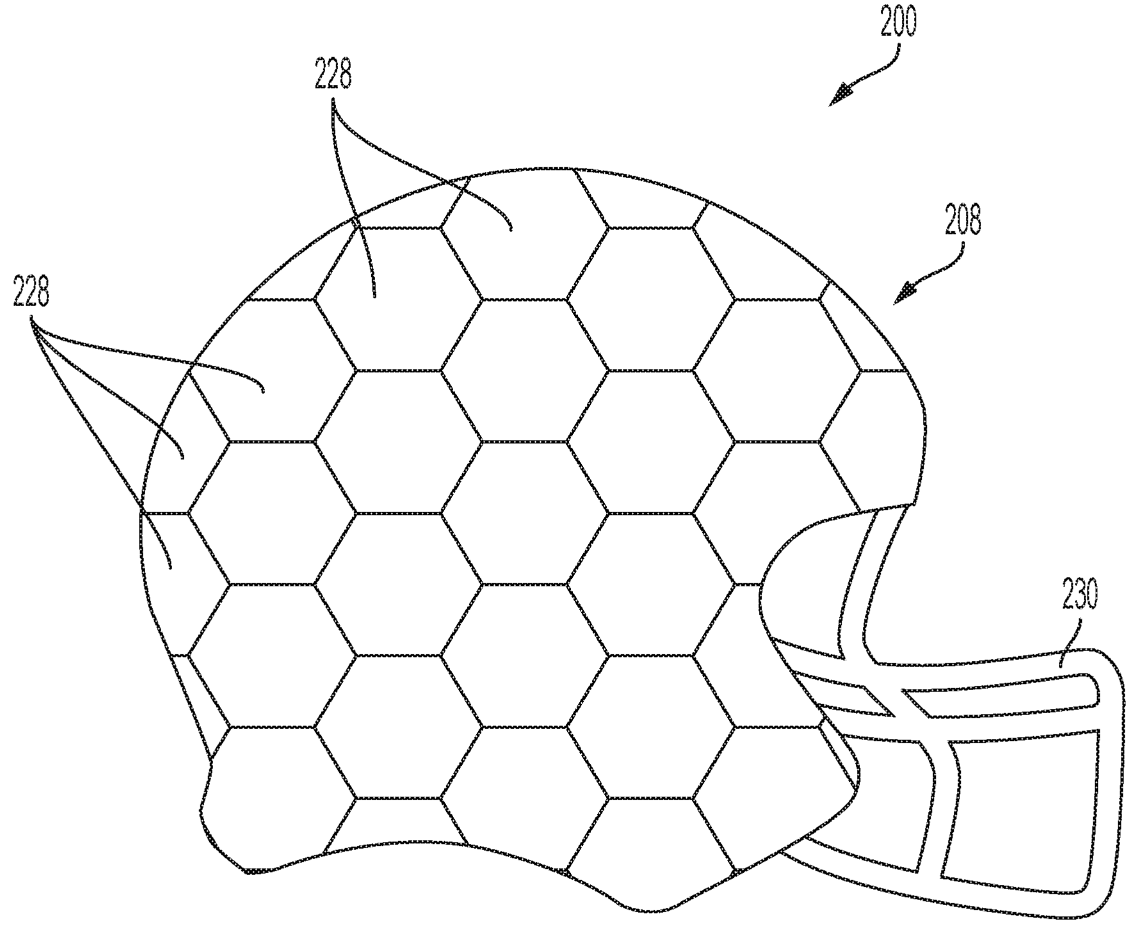
FIG. 8 is a side view of an alternate helmet with a segmented outer shell including a plurality of movable outer shell segments, an inner shell, flexible bearings between the inner shell and each outer shell segment, and a facemask in accordance with the present disclosure.

Referring to FIG. 7, outer shell 108 is seated on a plurality of bearings, each referred to herein as a node 114, and gel columns 112. Outer shell 108 includes a rigid (e.g., carbon fiber) inner layer 116 and a rigid (e.g., carbon fiber) outer layer 134 that define a chamber 160. Outer shell 108 also includes columns 118 that are positioned within chamber 160 of outer shell 108. Columns 118, like columns 112, may be constructed of gel, foam, or other suitable impact-absorbing materials and allow for additional compression of outer shell 108 to provide an additional force or impact absorption layer within outer shell 108.

Outer shell 108 also includes a plurality of recesses 120 in the outer layer 134 that receive a corresponding holding cap 122 that is configured to cooperate with a screw 126 attached to the flexible anchor 124 to moveably retain segment 128 on helmet 100 as discussed further herein. Suitable anchors 124 include zip fasteners, cables, or other flexible or moveable connectors.

Still referring to FIG. 7, helmet 100 includes a series of layers in its construction. In particular, the illustrative helmet 100 includes an interior padding 102, an inner shell or skull cap 104, the outer shell 108, and internal layers 106 in a space 138 between interior padding 102 and outer shell 108. Each layer of helmet 100 is described further below.

Interior padding 102 directly contacts the user's skull when helmet 100 is worn and provides comfort/padding to the user's skull. Interior padding 102 may be constructed of gel, foam, or another impact-absorbing material. In one embodiment, interior padding 102 is coupled to inner shell 104 by an adhesive. However, it is contemplated that other suitable coupling means may also be used, such as hook and loop fasteners (e.g., Velcro®) or mechanical fasteners, for example.

Figure 3:
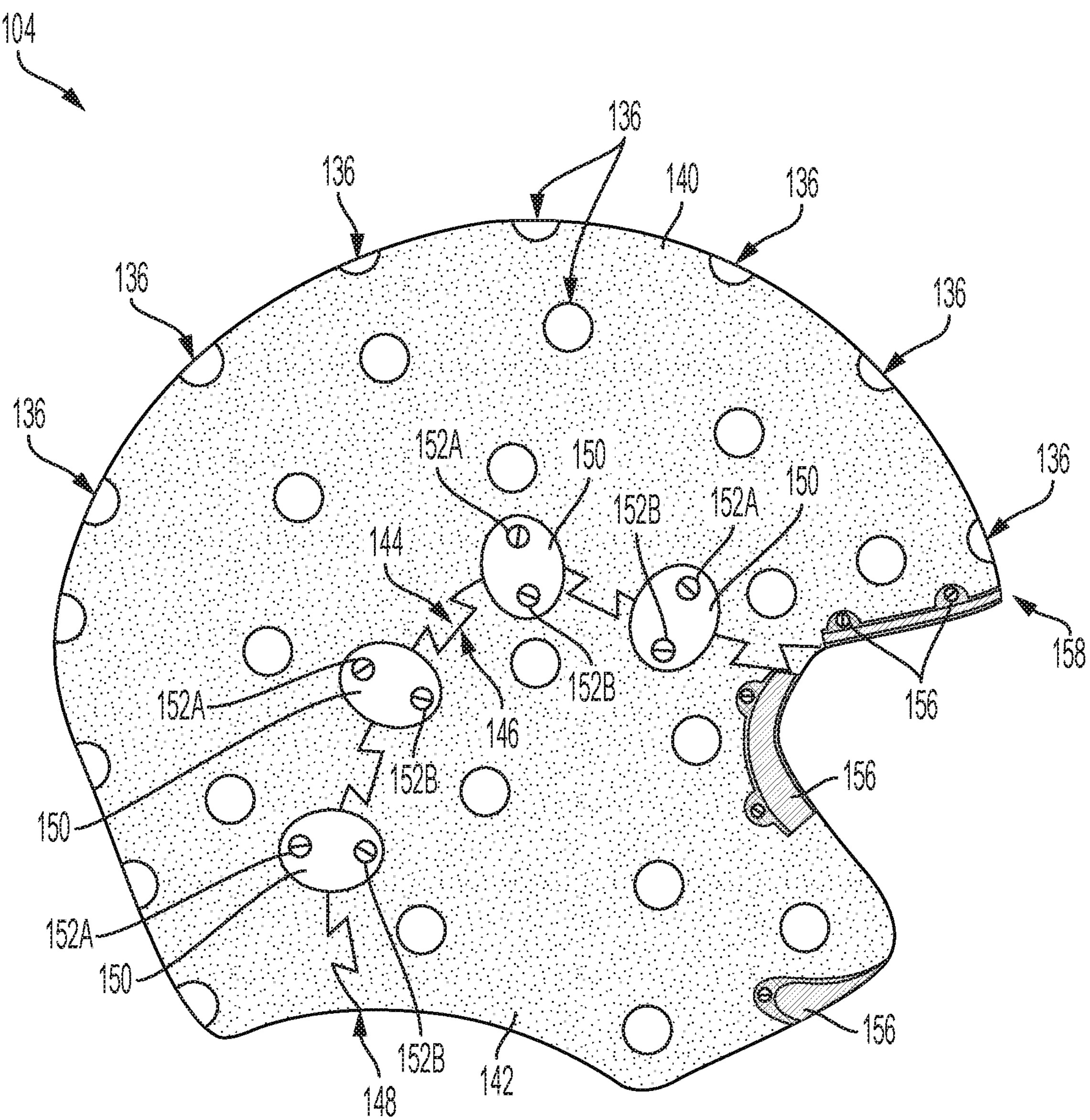
FIG. 3 is a side view of the helmet of FIG. 2 with the outer shell and internal layers removed to show the inner shell.

As shown in FIG. 3, inner shell 104 includes a head plate 140 and a cheek plate 142 that are removably coupled together to form inner shell 104. As shown, head plate 140 and cheek plate 142 have a complementary fit with one another along respective edges 144, 146 and are removably secured to each other by screw plates 150 and screws 152A, 152B. Illustratively, edges 144, 146 have an intermeshing (e.g., puzzle-like) fit in a surface direction as shown in FIG. 3 that is further secured with the installation of screw plates 150. Head plate 140 and cheek plate 142 may also have an interlocking (e.g., tongue-and-groove) fit in the cross-sectional direction, for example.

As mentioned previously, head plate 140 and cheek plate 142 are removably secured to each other by screw plates 150 and screws 152A, 152B. In particular, screw plate 150 is positioned onto inner shell 104 such that screw plate 150 traverses an interface 148 that is formed when head plate 140 and cheek plate 142 are joined together along respective edges 144, 146. Screw 152A is secured onto head plate 140 and screw 152B is secured onto cheek plate 142 such that head plate 140 and cheek plate 142 are securely fastened to one another by screw plate 150 during assembly of helmet 100.

This feature facilitates easy removal of helmet 100 without straining the user's head. When helmet 100 is disassembled, head plate 140 and cheek plate 142 can be decoupled by removing the screws 152A, 152B. and screw plates 150. In this way, cheek plate 142 can be individually separated from head plate 140. Once cheek plate 142 is removed, head plate 140 is more easily removed since the head plate 140 of helmet 100 will occupy a smaller surface area of the user's head. Thus, the inner shell 104 may serve as an emergency release system (ERS) for the helmet 100.

Inner shell 104 and the underlying interior padding 102 are sized to fit tightly against the user's head, which functions to keep the user's head stationary within helmet 100. Inner shell 104 also provides a frame to support the outer layers of helmet 100. In other words, inner shell 104 and interior padding 102 contact the user's head/skull when helmet 100 is worn such that there is limited space and a snug fit between the user's head/skull and inner shell 104 and interior padding 102. Inner shell 104 is light-weight and strong and may be made of a carbon fiber material, for example. In some embodiments, inner shell 104 may be made entirely of carbon fiber.

Figure 12:
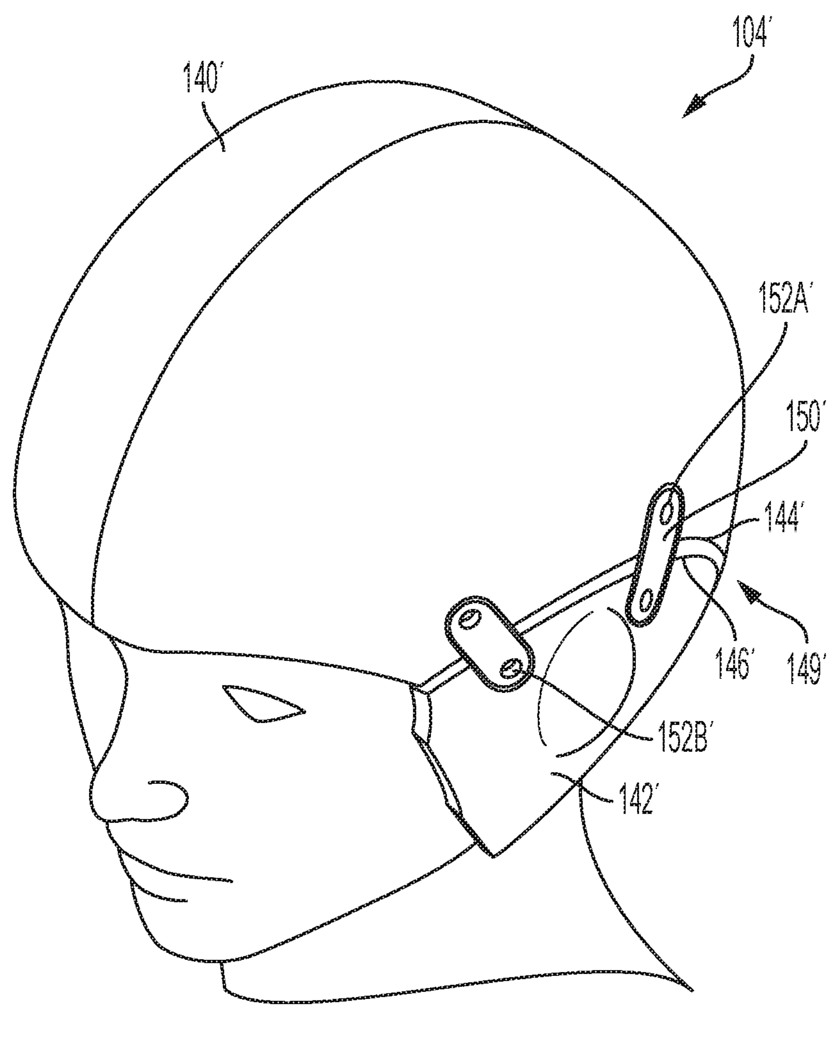
FIG. 12 is a perspective view of another inner shell positioned on a user's head.
Figure 13:
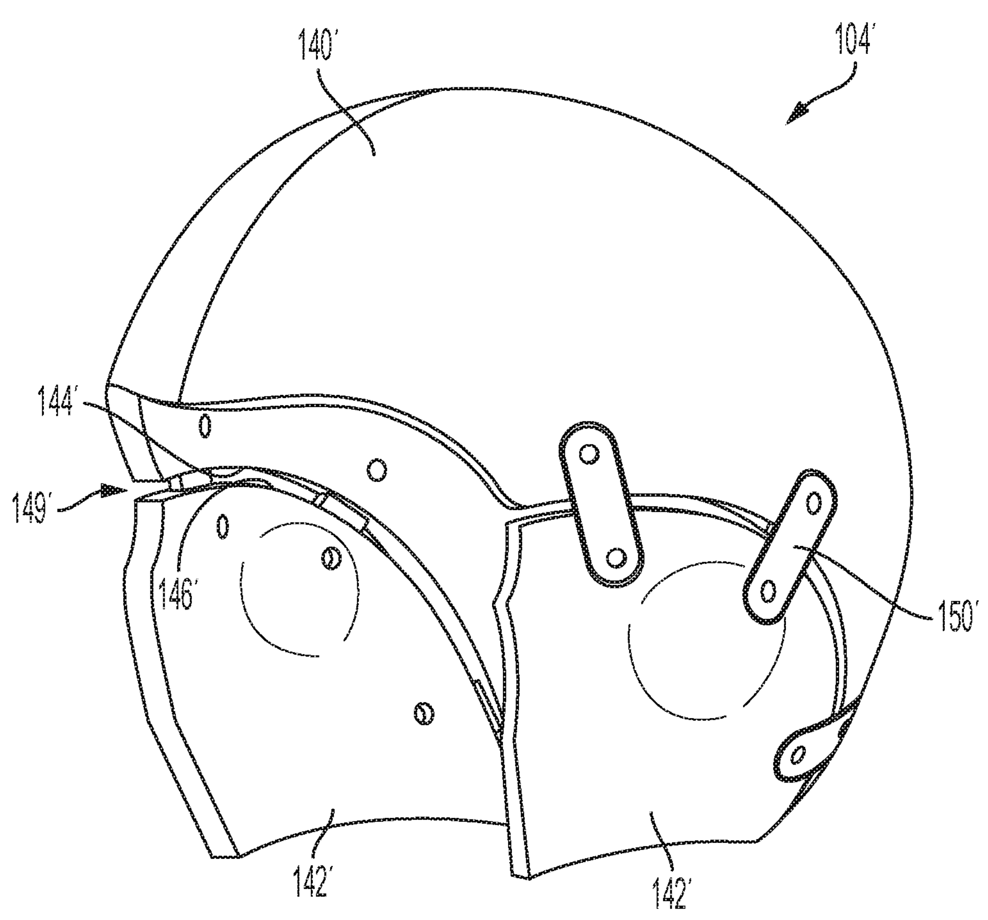
FIG. 13 is a perspective view of the inner shell of FIG. 12 removed from the user's head.

Referring next to FIGS. 12 and 13, another inner shell 104' is provided for use in helmet 100. Inner shell 104' is similar to the above-described inner shell 104 (FIG. 3), except as described herein. Inner shell 104' includes a head plate 140' and cheek plates 142' that are removably coupled together. Rather than having an intermeshing fit, the edges 144' of the head plate 140' are spaced apart from the edges 146' of the cheek plates 142' to define gaps 149' therebetween. The head plate 140' and cheek plates 142' are removably secured to each other by screw plates 150' and screws 152A', 152B', illustratively three screw plates 150' per cheek plate 142'. In particular, each screw plate 150' traverses the gap 149' between the head plate 140' and the adjacent cheek plate 142' with screw 152A' being secured onto head plate 140' and screw 152B' being secured onto cheek plate 142', as shown in FIG. 12. The screw plates 150' may be recessed into the head plate 140' and cheek plates 142' such that inner shell 104' has a substantially smooth, continuous outer surface.

Returning to FIGS. 3 and 7, inner shell 104 includes base plate holes 136 within inner shell 104 that are configured to receive a base plate 132. Base plate 132 is inserted into a corresponding base plate hole 136 as shown in FIG. 7 and functions to receive at least one flexible anchor 124 from a corresponding movable segment 128 of helmet 100, as discussed further herein. Base plate 132 may be made of light-weight metal (e.g., aluminum), plastic, or another suitable material.

As mentioned previously, internal layers 106 are positioned within space 138 as defined between inner shell 104 and outer shell 108. Internal layers 106 provide additional impact protection or force absorption for helmet 100 and include an inner shell covering 110, columns 112, and nodes 114. Inner shell covering 110, columns 112, and nodes 114 may be constructed of gel, foam, or other suitable impact-absorbing materials.

Inner shell covering 110 is removably coupled to inner shell 104. In some embodiments, inner shell covering 110 is removably coupled to inner shell 104 by a temporary or non-structural adhesive, hook and loop fasteners (e.g., Velcro®), or mechanical fasteners, for example. When in place, inner shell covering 110 provides a buffer or cushion between inner shell 104 and outer shell 108 such that outer shell 108 does not directly contact inner shell 104. When removed, inner shell covering 110 provides access to the underlying inner shell 104, such as plates 150 of inner shell 104, as described below.

As shown in FIG. 7, each node 114 sits on inner shell covering 110 and is captured beneath a corresponding segment 128 of outer shell 108 around its corresponding anchor 124 as discussed further herein. Each node 114 is substantially hemispherical or spherical in shape, at least along its upper surface, and contacts the corresponding segment 128 of outer shell 108 to provide maneuverability thereby allowing the segment 128 of outer shell 108 to rotate, tilt, slide, or move in any direction about node 114 upon impact. Node 114 may also be flexible in construction and configured to compress upon impact. The increased mobility of outer shell 108 via node 114 enables helmet 100 to provide greater impact absorption upon application of an impact force onto helmet 100. Constructing nodes 114 of gel may aid in the mobility of segments 128 across the smooth, potentially lubricated surface of the gel nodes 114. Each node 114 may be coupled to the underlying inner shell covering 110 with adhesive, mechanical fasteners, or other suitable connectors.

Adjacent to node 114 are columns 112 that are spaced apart from each other and node 114. Columns 112 are coupled to inner shell gel covering 110 and outer shell 108 with adhesive, mechanical fasteners, or other suitable connectors and function to provide additional impact absorption by compressing upon application of an impact force onto helmet 100.

Assembling helmet 100 is generally shown in FIGS. 2-6. Beginning with FIG. 3, an assembled inner shell 104 is shown including the head plate 140 and the cheek plate 142. Head plate 140 and cheek plate 142 are removably secured to each other by screw plates 150 and screws 152A, 152B as discussed previously.

Figure 4:
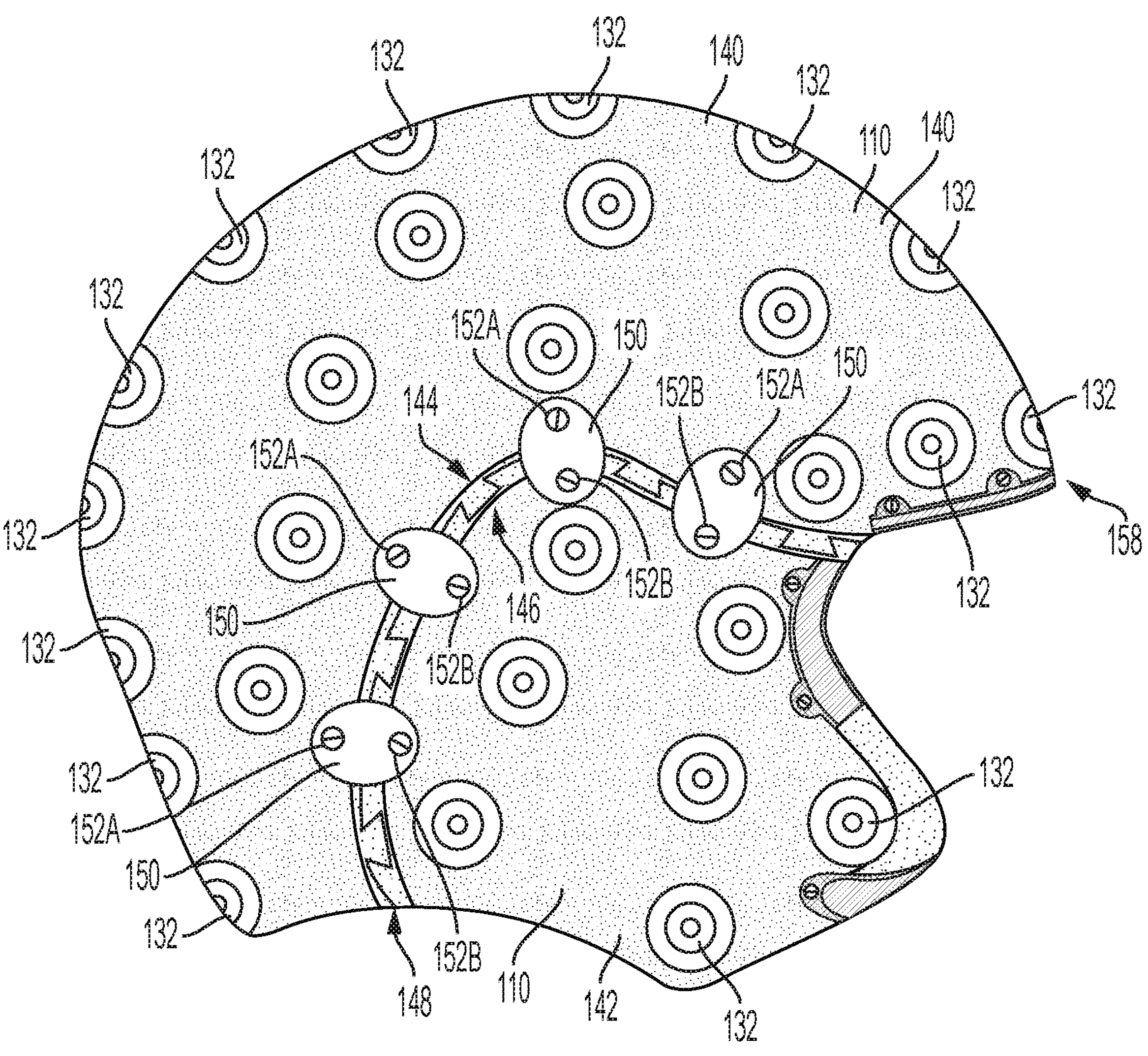
FIG. 4 is a side view of the helmet of FIG. 3 with an inner shell covering applied to the helmet.
Figure 5:
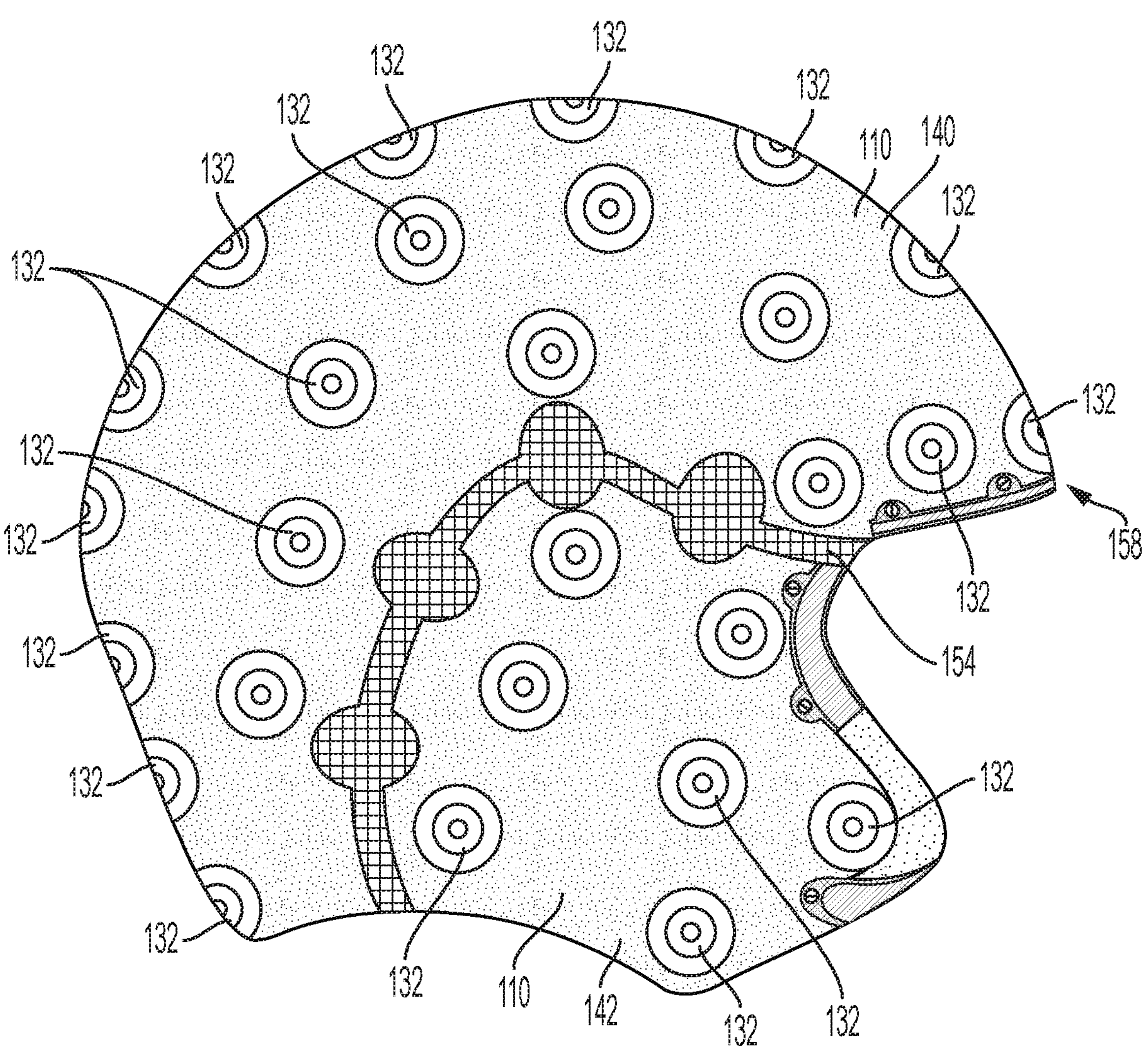
FIG. 5 is a side view of the helmet of FIG. 4 with a seam covering applied to the helmet to cover screw plates of the helmet.

Referring now to FIG. 4, base plates 132 are inserted into base plate holes 136 (FIG. 3) of inner shell 104. Also, inner shell covering 110 is applied onto inner shell 104, and a seam covering 154 (FIG. 5) is applied onto the interface 148 of edges 144, 146 and screw plates 150. Seam covering 154 may be separable from or part of the adjacent inner shell covering 110.

Figure 6:
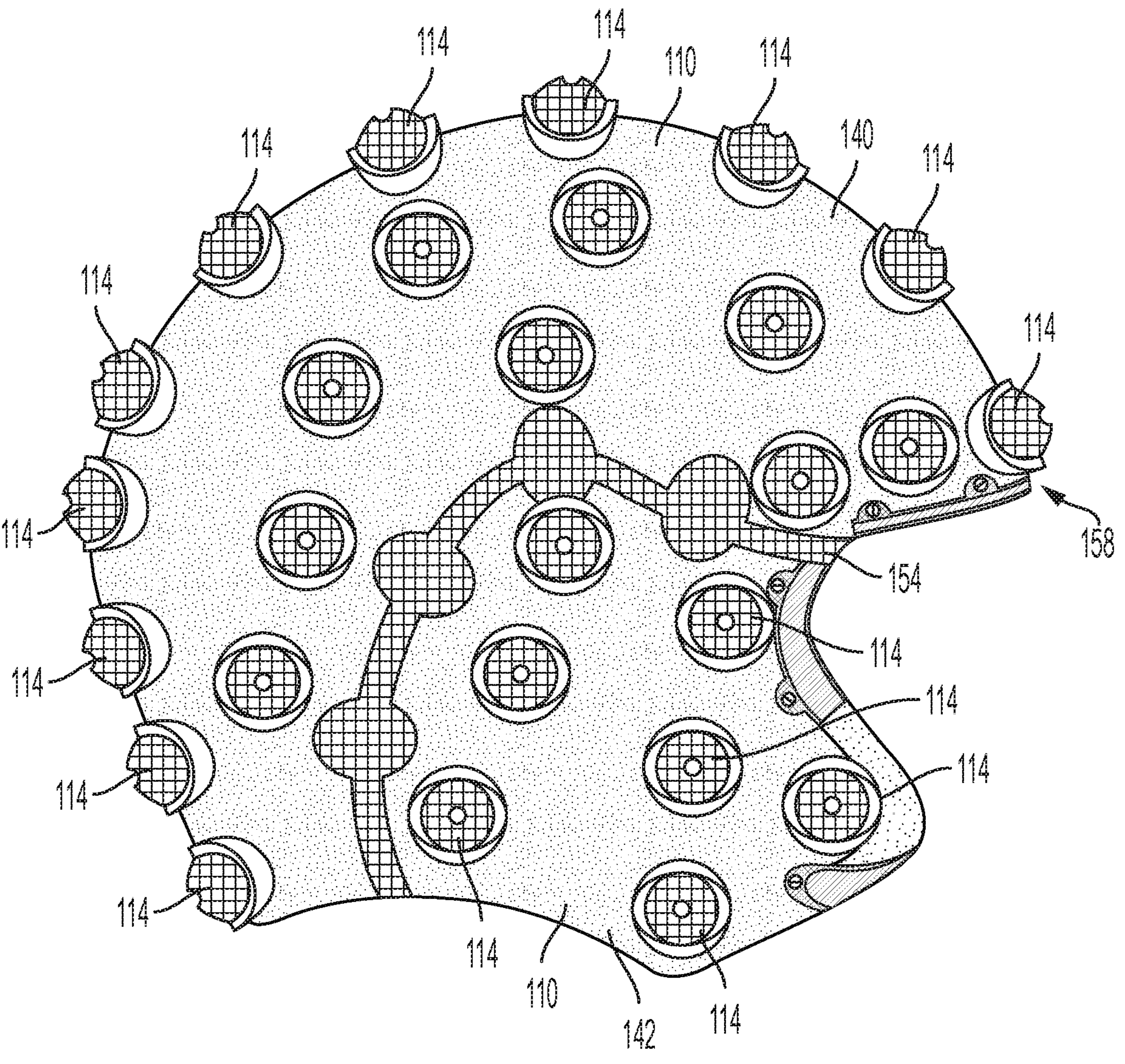
FIG. 6 is a side view of the helmet of FIG. 5 with flexible bearings applied to the helmet each of which is coupled to a movable outer shell segment of FIG. 1.

Referring to FIG. 6, nodes 114 are applied onto inner shell covering 110. Then, as shown in FIG. 2, segments 128 of outer shell 108 are placed onto corresponding nodes 114. As shown in FIG. 7, recess 120 of outer shell 108 is in substantial alignment with node 114 and base plate 132. Anchors 124 are then installed to hold the layers of helmet 100 together. As shown, anchor 124 is a zip fastener that extends from outer shell 108, extends through node 114, and fastens to base plate 132 such that each segment 128 of outer shell 108 is moveably coupled to base plate 132. In addition, a screw 126 is inserted into recess 120 and further secures the layers of helmet 100 by connecting outer shell 108 to inner shell gel covering 110 and to internal layers 106 therebetween.

After the layers are fastened as described herein, facemask 130 is coupled to the helmet 100 via fasteners 170 as shown in FIG. 1. In particular, as shown in FIG. 3, inner shell 104 includes facemask padding 156 around rim 158 of inner shell 104 to accommodate fastening of facemask 130. Facemask padding 156 may be made of gel, foam, or another impact-absorbing material.

To remove helmet 100, reversal of the steps described herein is required. That is, facemask 130 is decoupled from helmet 100. Then, screw 126 is removed and anchor 124 is cut to decouple the layers of helmet 100. Outer shell 108, internal layers 106, and base plate 132 are then removed such that the head plate 140, cheek plate 142, and screw plates 150 remain. Then, as mentioned previously, respective screws 152A, 152B and corresponding screw plates 150 are removed to decouple head plate 140 and cheek plate 142 resulting in complete disassembly of helmet 100.

Second Helmet Embodiment

Referring now to FIGS. 8-11, another helmet 200 is shown with a plurality of individual segments 228 that cooperate to form an outer shell 208 and a facemask 230 coupled to helmet 200 via fasteners (not shown). As discussed herein, segments 228 are each independently movable relative to a user to provide impact protection to a user's skull when in use. The illustrative helmet 200 includes ten segments 228 located along a centerline of the helmet 200, about twenty-two segments 228 located on a right side of the helmet 200, and about twenty-two segments 228 located on a left side of the helmet 100 (not shown), but the number and location of segments 228 may vary. Together, the segments 228 make up the entire outer shell 208, spanning entirely from a front side to a rear side of the helmet 200 and from the right side to the left side of the helmet 200. Except as described below, helmet 200 and its assembly may be similar to that of the above-described helmet 100.

Figure 9:
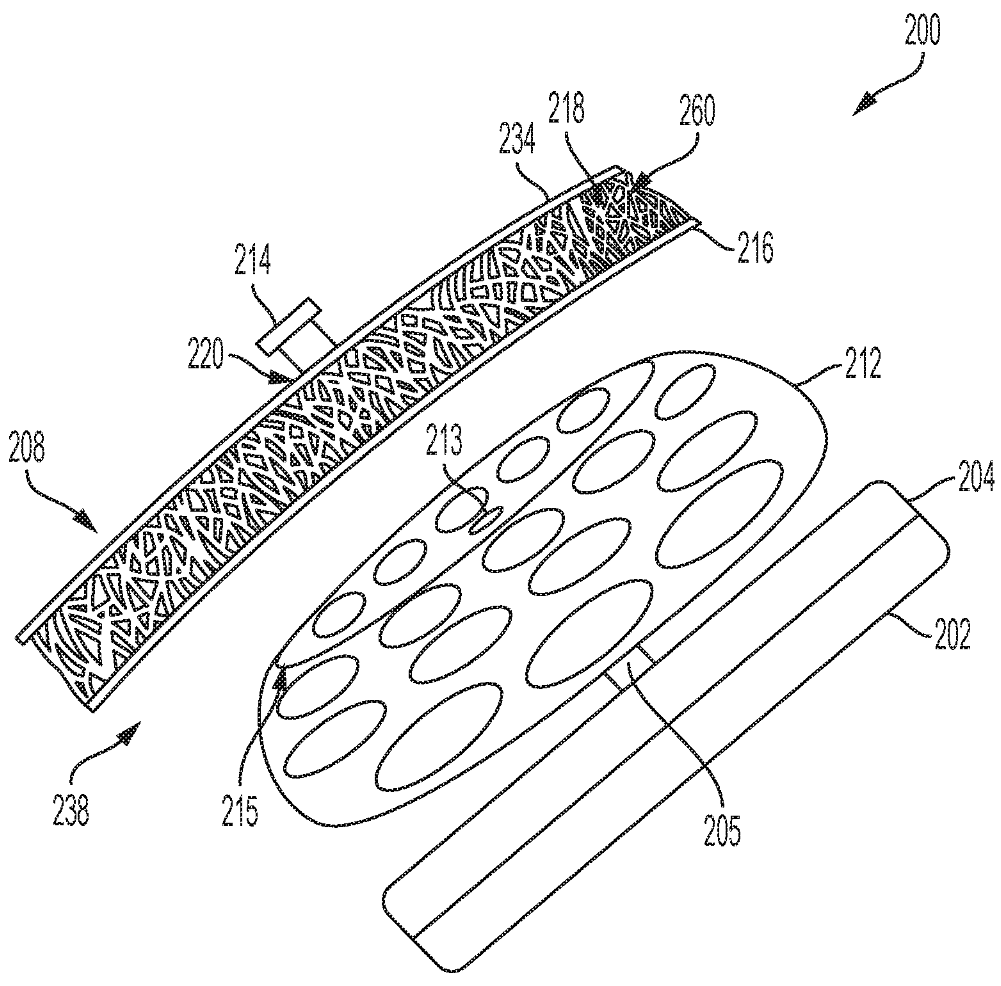
FIG. 9 is a cross sectional view of the helmet of FIG. 8.

Referring to FIG. 9, helmet 200 includes a series of layers in its construction. In particular, the illustrative helmet 200 includes an interior padding 202, an inner shell 204, the outer shell 208, and a plurality of bearings, each referred to herein as pad 212, in a space 238 between inner shell 204 and outer shell 208. Each layer of helmet 200 is described further below.

Referring still to FIG. 9, outer shell 208 includes a rigid (e.g., carbon fiber or high-density polyethylene) inner layer 216 and a rigid (e.g., carbon fiber or high-density polyethylene) outer layer 234 that define a chamber 260 within which impact-absorbing materials in the shape of columns 218 or other suitable shapes are positioned. Suitable impact-absorbing materials for use in chamber 260 include gel or foam, for example, which allow for additional compression of outer shell 208 to provide an additional force or impact absorption layer within outer shell 208. Outer shell 208 also includes a recess 220 in the outer layer 234 that receive a corresponding upper screw 214 that rests on outer layer 234 and is seated within chamber 260. As shown in FIG. 9, screw 214 attaches to the top of pad 212 as discussed in greater detail herein.

Interior padding 202 directly contacts the user's skull when helmet 200 is worn and provides comfort/padding to the user's skull. Interior padding 202 may be constructed of gel, foam, or another impact-absorbing material. In one embodiment, interior padding 202 is coupled to inner shell 204 by an adhesive. However, it is contemplated that other suitable coupling means may also be used, such as hook and loop fasteners (e.g., Velcro®) or mechanical fasteners, for example.

Similar to inner shell 104, inner shell 204 may include a head plate and a cheek plate (not shown) that are removably coupled together to form inner shell 204. Similar to the prior embodiment, the head plate and cheek plate may have a complementary fit with one another along their respective edges and may be removably secured to each other by screw plates and screws. The edges can have an intermeshing (e.g., puzzle-like) fit in a surface direction that is further secured with the installation of screw plates. The head plate and cheek plate may also have an interlocking (e.g., tongue-and-groove) fit in the cross-sectional direction, for example. Additional details for coupling the head plate and the cheek plate via screws and screw plates are analogous to those discussed herein with respect to the previous embodiment.

Similar to helmet 100, the configuration of inner shell 204 facilitates easy removal of helmet 200 without straining the user's head after severe injuries. When helmet 200 is disassembled, the head plate and cheek plate can be decoupled by removing the screws and screw plates. In this way, the cheek plate can be individually separated from the head plate. Once the cheek plate is removed, the head plate is more easily removed since the head plate of helmet 200 will occupy a smaller surface area of the user's head.

Inner shell 204 and the underlying interior padding 202 are sized to fit tightly against the user's head, which functions to keep the user's head stationary within helmet 200. Inner shell 204 also provides a frame to support the outer layers of helmet 200. In other words, inner shell 204 and interior padding 202 contact the user's head/skull when helmet 200 is worn such that there is limited space and a snug fit between the user's head/skull and inner shell 204 and interior padding 202. Inner shell 204 is light-weight and strong and may be made of a carbon fiber material or high-density polyethylene, for example. In some embodiments, inner shell 204 may be made entirely of carbon fiber or high-density polyethylene. Inner shell 204 may also include a screw insert (not shown) that is configured to receive a lower screw 205 attached to the bottom of pad 212.

Figure 10:
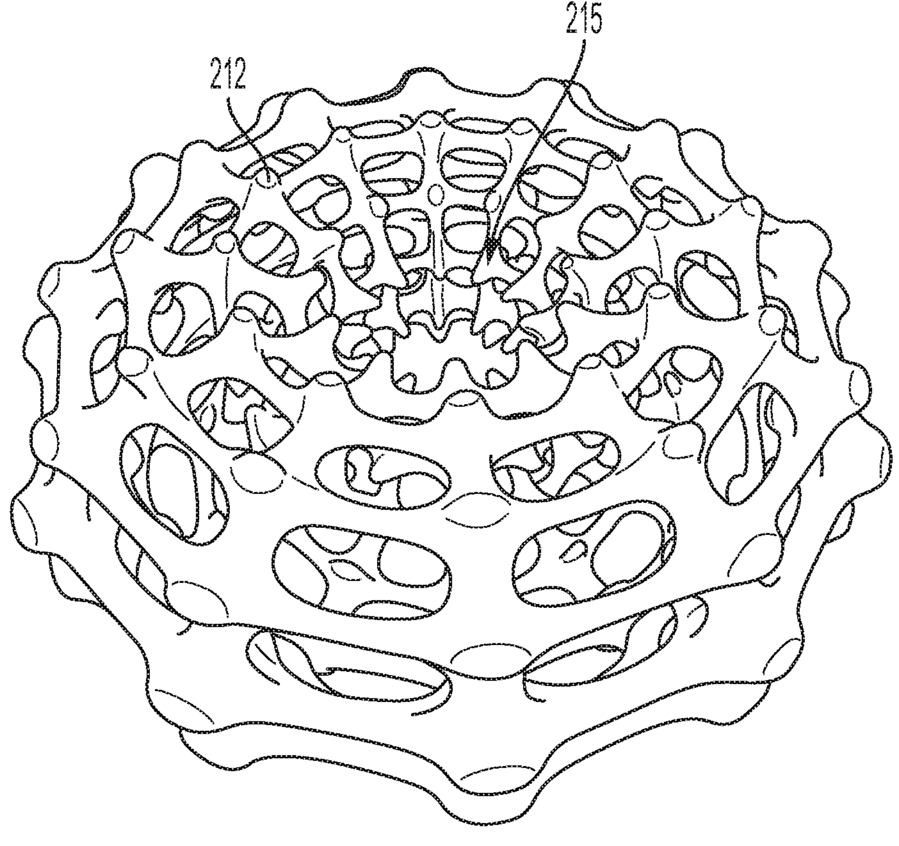
FIG. 10 is a perspective view of the flexible bearing in accordance with the present disclosure.
Figure 11:
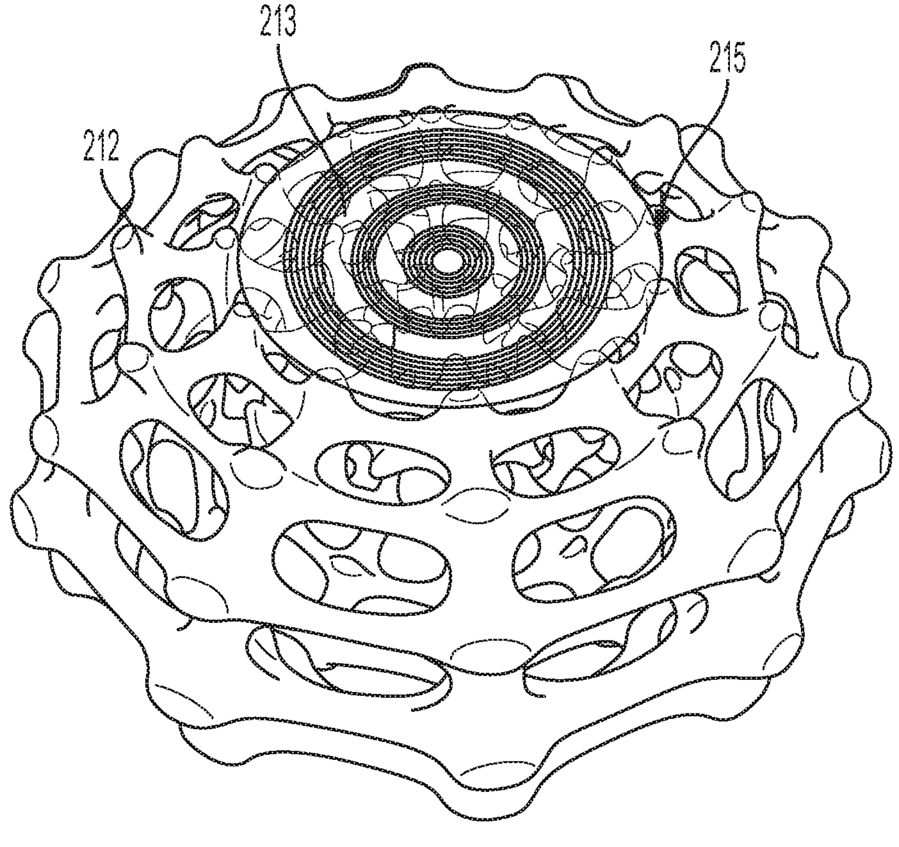
FIG. 11 is another perspective view of the flexible bearing with a screw insert seated into the bearing in accordance with the present disclosure.

As mentioned previously, pad 212 is positioned within space 238 as defined between inner shell 204 and outer shell 208. The illustrative pad 212 is torus-shaped, but this shape may vary. In certain embodiments, pad 212 may be formed by 3D printing or another suitable manufacturing process. Pad 212 provides additional impact protection or force absorption for helmet 100 and attaches to a corresponding segment 228 of outer shell 208 by upper screw 214 and to inner shell 204 by lower screw 205. For example, as shown in FIGS. 9-11, pad 212 may include an upper recess 215 that is shaped to receive a screw insert 213, and the screw insert 213 may be configured to receive upper screw 214. A similar screw insert may be placed in the lower surface of pad 212 for the lower screw 205. In this way, pad 212 is coupled to segment 228 of outer shell 208 to provide maneuverability thereby allowing segment 228 of outer shell 208 to rotate, tilt, slide, or move in any direction relative to inner shell 204 upon impact. Pad 212 may also be flexible in construction and configured to compress upon impact. The increased mobility of outer shell 208 via pad 212 enables helmet 200 to provide greater impact absorption upon application of an impact force onto helmet 200.

To remove helmet 200 in emergency situations, reversal of the steps described herein is required similar to the steps described with respect to the previous embodiment of helmet 100. That is, facemask 230 is decoupled from helmet 200. Next, upper screws 214 are removed thereby freeing outer shell 208. Then, pads 212 are freed by removing lower screws 205 from inner shell 204. Finally, inner shell 204 may be disassembled and removed as described above.

Neck Restraint

Figure 14:
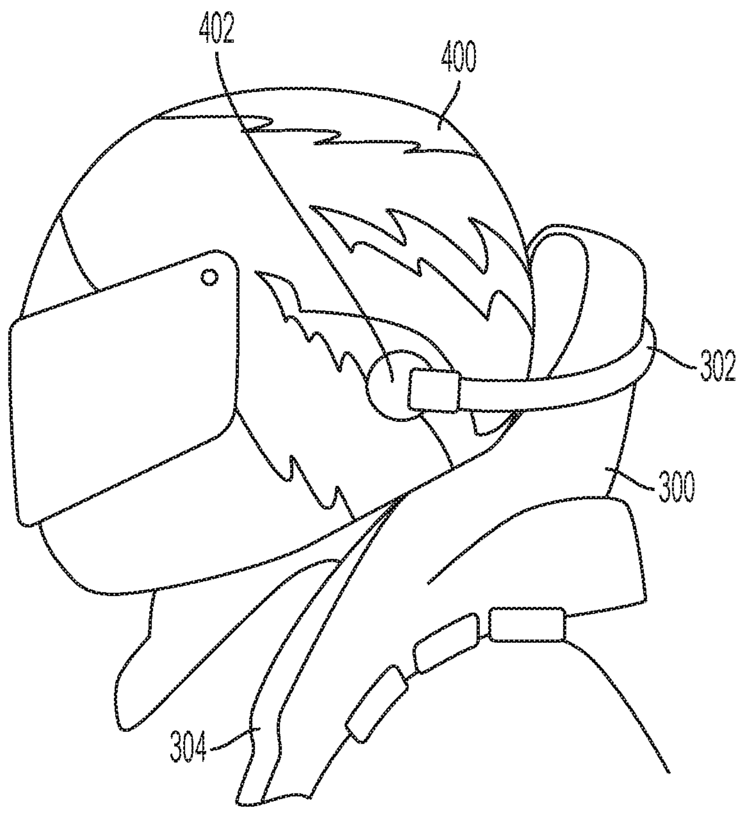
FIG. 14 is a perspective view of a helmet having a port assembly coupled to a neck restraint via a restraint cord.

Referring to FIG. 14, a helmet 400 (which may have features in common with the above-described helmet 100 and/or helmet 200) is secured to a neck restraint 300 via a restraint cord 302. Neck restraint 300 is configured to support and restrain the neck and head of the wearer to protect against or mitigate injury. As shown, restraint cord 302 extends around the neck restraint 300 to couple with the helmet 400 via a port assembly 402 of the helmet 400. Neck restraint 300 may further include shoulder pads 304 to provide further support and comfort to the user.

Figure 15:
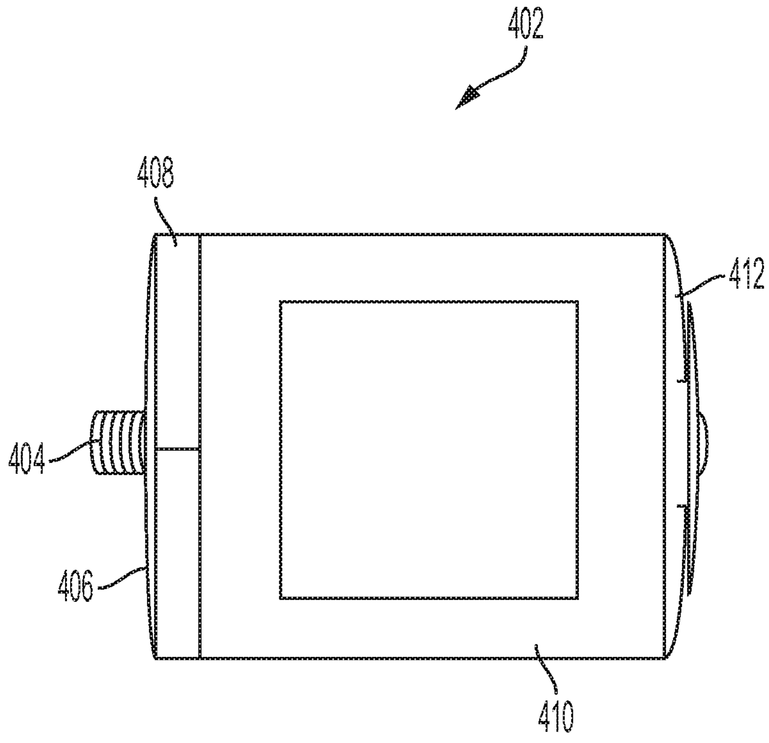
FIG. 15 is a side elevational view of the port assembly of FIG. 14.

Now referring to FIG. 15, a cross-section of port assembly 402 is illustrated. The port assembly 402 includes a screw 404, a seal 406, a compression layer 408, a post 410, and a restraint anchor 412. Screw 404 extends from compression layer 408 and post 410 to fasten to an inner shell 420 (FIG. 16A) of helmet 400 (FIG. 14) as further discussed herein. Inner shell 420 as discussed herein may correspond to inner shell 104 of helmet 100 and/or inner shell 204 of helmet 200 as discussed above. Seal 406 is disposed around screw 404 and adjacent to compression layer 408, while the compression layer 408 is further adjacent to post 410, so that compression layer 408 is disposed between seal 406 and post 410. In some embodiments, port assembly 402 may not include compression layer 408, seal 406, or either of compression layer 408 or seal 406.

Post 410 is illustratively comprised of aluminum, although another polymeric or metallic material may be used. Ideally, post 410 is lightweight while maintaining the ability to withstand against application of external forces. Post 410 may vary in length and girth depending on the size and shape of an outer shell 422 (FIG. 16B) of helmet 400 (FIG. 14) as discussed further herein. Outer shell 422 as discussed herein may correspond to either outer shell 108 of helmet 100 and/or outer shell 208 of helmet 200 as discussed above. Post 410 may be hollow, as shown in FIG. 15, to provide for a lighter component, or may otherwise be solid. A restraint anchor 412 is disposed on post 410 opposite of the screw 404 and is configured to couple to restraint cord 302 (FIG. 14) to secure helmet 400 (FIG. 14) to neck restraint 300 (FIG. 14).

Figure 16B:
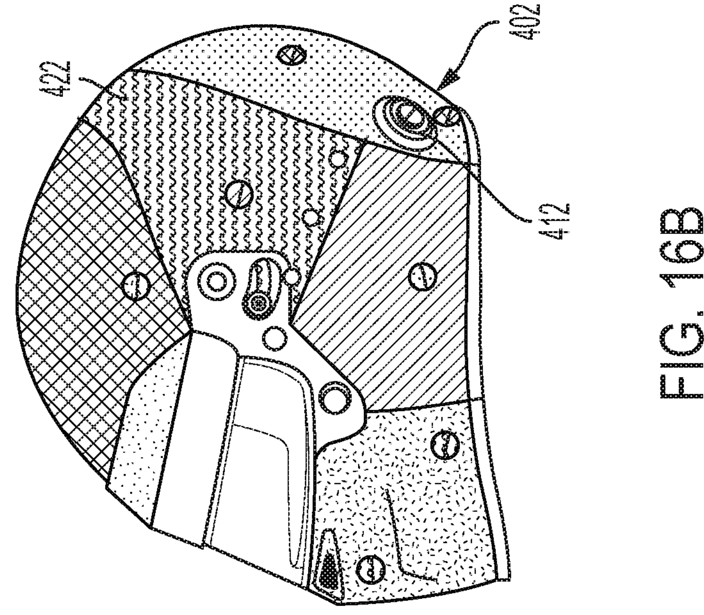
FIG. 16B is a side elevational view of the helmet of FIG. 14 showing the port assembly adjacent to an outer shell of the helmet.
Figure 16A:
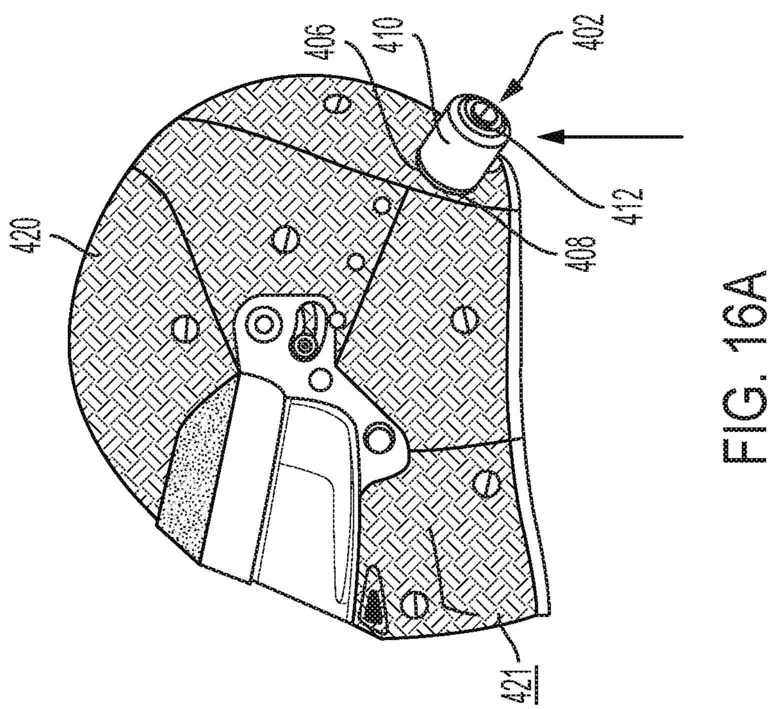
FIG. 16A is a side elevational view of the helmet of FIG. 14 showing the port assembly coupled to an inner shell of the helmet.

Now referring to FIGS. 16A and 16B, port assembly 402 may be removably coupled or otherwise coupled to inner shell 420 using screw 404 (FIG. 15). Seal 406 and compression layer 408 are disposed between post 410 and inner shell 420. Seal 406 provides interference between the port assembly 402 and inner shell 420 to strengthen the connection between port assembly 402 and helmet 400, while compression layer 408 provides cushion between post assembly 402 and inner shell 420 to prevent damage to inner shell 420 while ensuring a tight connection between inner shell 420 and port assembly 402. Post 410 extends outward from the surface 421 of inner shell 420. Outer shell 422 is assembled over inner shell 420 to form helmet 400 in the manner described above. The length of post 410 is such that post 410 is sandwiched between inner shell 420 and outer shell 422, and restraint anchor 412 lays substantially flush with outer shell 422 but is exposed for removable coupling with the restraint cord 302 (FIG. 14).

While this invention has been described as having an exemplary design, the present invention may be further modified within the spirit and scope of this disclosure. For example, various features of the first embodiment of helmet 100 may be combined with various features of the second embodiment of helmet 200. This application is therefore intended to cover any variations, uses, or adaptations of the invention using its general principles. Further, this application is intended to cover such departures from the present disclosure as come within known or customary practices in the art to which this invention pertains.

What is claimed is:

1. A helmet comprising:

an inner shell comprising a first plurality of segments, the first plurality of segments comprising:

a head plate;

a cheek plate removably coupled to the head plate such that the head and cheek plate decouple without exerting strain on a user's head;

an outer shell coupled to the inner shell, the outer shell comprising a second plurality of segments;

wherein the outer shell is spaced apart from the inner shell to define a space therebetween; and an impact-absorbing bearing positioned between the outer shell and the inner shell; and wherein the outer shell is movable about the bearing relative to the inner shell.

2. The helmet of claim 1, wherein the outer shell includes an inner layer coupled to an outer layer such that a chamber is defined therebetween, wherein at least one impact-absorbing column is positioned within the chamber to provide compressibility of the outer shell.

3. The helmet of claim 1, further comprising a flexible anchor configured to extend from the outer shell, through the at least one impact-absorbing internal layer, and moveably connect to the inner shell.

4. The helmet of claim 1, wherein the head plate and the cheek plate each include corresponding edges that intermesh with each other along an interface between the head plate and the cheek plate.

5. The helmet of claim 4, wherein the head plate and the cheek plate are removably coupled to each other by a plurality of screw plates positioned across the interface such that at least one screw is anchored to the head plate and at least one screw is anchored to the cheek plate.

6. The helmet of claim 1, wherein the inner shell is sized to tightly fit a user's head.

7. The helmet of claim 1, wherein at least an upper surface of the bearing is hemispherically-shaped or torus-shaped.

8. The helmet of claim 1, wherein the bearing is constructed of gel.

9. A helmet comprising:

an inner shell comprising a plurality of segments, the plurality of segments comprising:

a head plate;

a cheek plate removably coupled to the head plate such that the head and cheek plate decouple without exerting strain on a user's head;

an outer shell removably coupled to the inner shell, the outer shell spaced apart from the inner shell to define a space therebetween, the outer shell includes:

a plurality of independently movable segments, each independently moveable segment moveably coupled to the inner shell such that the plurality of independently movable segments are movable upon impact to disperse impact forces applied onto the movable segments; and at least one impact-absorbing internal layer within the space.

10. The helmet of claim 9, wherein the at least one impact-absorbing internal layer includes a plurality of bearings, each bearing associated with a corresponding independently moveable segment, wherein the corresponding independently movable segment is seated on the bearing such that the independently movable segment is movable about the bearing.

11. The helmet of claim 10, wherein the outer shell includes an inner layer coupled to an outer layer such that a chamber is defined therebetween, wherein at least one gel column is positioned within the chamber to provide compressibility of the outer shell upon impact.

12. The helmet of claim 11, wherein the inner shell includes a plurality of screw inserts configured to receive the bearing.

13. The helmet of claim 9, wherein the outer shell and the at least one impact-absorbing internal layer are coupled to each other by a flexible anchor configured to extend from the outer shell, through the at least one impact-absorbing internal layer, and moveably connect to the inner shell.

14. The helmet of claim 9, wherein the head plate and the cheek plate each include corresponding edges that intermesh with each other along an interface between the head plate and the cheek plate; and wherein the head plate and the cheek plate are coupled to each other by a plurality of screw plates positioned across the interface such that at least one screw is anchored to the head plate and at least one screw is anchored to the cheek plate.

15. The helmet of claim 9, wherein the inner shell and the outer shell are made of carbon fiber or high-density polyethylene.

16. The helmet of claim 9, further including a facemask coupled to the inner shell.

17. A method of assembling the helmet of claim 1 comprising: providing a plurality of base plates within corresponding base plate holes of an inner shell; seating a plurality of bearings onto the inner shell; placing a plurality of segments of an outer shell onto corresponding bearings; moveably coupling each segment of the outer shell to the corresponding base plate of the inner shell via the corresponding bearing.

18. The method of claim 17, wherein each segment is configured to independently move across its corresponding bearing upon impact.

19. The method of claim 17, wherein providing a base plate includes: coupling a head plate of the inner shell to a cheek plate of the inner shell along an interface of the head plate and the cheek plate by at least one screw plate, wherein at least one screw is anchored to the head plate and at least one screw is anchored to the cheek plate.

20. The method of claim 17, further including coupling an interior helmet padding to the inner shell.

21. The method of claim 17, further including coupling a facemask to the helmet.

22. The helmet of claim 1, wherein the plurality of segments of the outer shell comprise a plurality of independently moveable segments, each independently moveable segment is moveably coupled to the inner shell such that the plurality of independently moveable segments are movable upon impact to disperse impact forces applied onto the moveable segments.

23. The helmet of claim 22, further comprising a plurality of base plates within corresponding base plate holes of the inner shell.

24. The helmet of claim 23, wherein a plurality of bearings is seated onto the inner shell.

25. The helmet of claim 24, wherein each of the plurality of independently moveable segments of the outer shell is coupled to a corresponding base plate of the plurality of base plates by a corresponding bearing of the plurality of bearings.

26. The helmet of claim 1, further comprising an interior helmet pad coupled to the inner shell.

27. The helmet of claim 1, wherein the first plurality of segments form a continuous head covering.

* * * * *